United States Patent
Castell et al.

(10) Patent No.: US 8,347,390 B2
(45) Date of Patent: *Jan. 1, 2013

(54) WIRELESS COMMUNICATION SYSTEM CONGESTION REDUCTION SYSTEM AND METHOD

(75) Inventors: William D. Castell, Waterloo (CA);
Allan D. Lewis, New Dundee (CA);
Tabitha K. Ferguson, Waterloo (CA);
Bill Yuan, Waterloo (CA); Ian M. Patterson, Petersburg (CA)

(73) Assignee: Research In Motion Limited, Waterloo (CA)

( * ) Notice: Subject to any disclaimer, the term of this patent is extended or adjusted under 35 U.S.C. 154(b) by 309 days.

This patent is subject to a terminal disclaimer.

(21) Appl. No.: 12/777,300

(22) Filed: May 11, 2010

(65) Prior Publication Data

US 2010/0223670 A1   Sep. 2, 2010

Related U.S. Application Data

(63) Continuation of application No. 11/544,532, filed on Oct. 9, 2006, now Pat. No. 7,747,691, which is a continuation of application No. 10/094,201, filed on Mar. 8, 2002, now Pat. No. 7,136,920.

(60) Provisional application No. 60/274,510, filed on Mar. 9, 2001.

(51) Int. Cl.
*G06F 11/00* (2006.01)

(52) U.S. Cl. .............................. 726/24; 726/12

(58) Field of Classification Search .................... 726/24, 726/22–23, 11–13; 713/188; 709/206–207, 709/223–224, 235

See application file for complete search history.

(56) References Cited

U.S. PATENT DOCUMENTS

| | | | |
|---|---|---|---|
| 5,832,208 A * | 11/1998 | Chen et al. | 726/24 |
| 6,052,709 A | 4/2000 | Paul | |
| 6,661,877 B1 * | 12/2003 | Lee et al. | 379/67.1 |
| 6,701,440 B1 | 3/2004 | Kim et al. | |
| 6,779,022 B1 | 8/2004 | Horstmann et al. | |
| 6,785,732 B1 | 8/2004 | Bates et al. | |
| 6,871,214 B2 | 3/2005 | Parsons et al. | |
| 6,898,715 B1 * | 5/2005 | Smithson et al. | 726/24 |
| 7,210,168 B2 | 4/2007 | Hursey et al. | |
| 2001/0034225 A1 * | 10/2001 | Gupte et al. | 455/412 |

FOREIGN PATENT DOCUMENTS

| | | |
|---|---|---|
| EP | 1 333 360 A2 | 8/2003 |
| EP | 1 487 081 A2 | 12/2004 |
| WO | 2005/013456 A1 | 2/2005 |

* cited by examiner

*Primary Examiner* — Samson Lemma
(74) *Attorney, Agent, or Firm* — Jones Day

(57) ABSTRACT

A messaging server forwards emails to mobile communication devices of users to whom the emails were respectively addressed. An antivirus server determines whether an email addressed to a user of a mobile communication device, to be forwarded by the messaging server to the mobile communication device, is infected with a virus. In response to determining the email is infected with a virus, a bulletin generator transmits, to the mobile communication devices besides the mobile communication device of the addressee of the email determined to be infected, an all points bulletin message disclosing the existence of the virus. The bulletin message is transmitted directly to, instead of via email to, the wireless mobile communication devices.

20 Claims, 13 Drawing Sheets

WIRELESS COMMUNICATION SYSTEM CONGESTION REDUCTION SYSTEM AND METHOD

CROSS-REFERENCE TO RELATED APPLICATIONS

This is a continuation of U.S. patent application Ser. No. 11/544,532, filed Oct. 9, 2006, which is a continuation of U.S. patent application Ser. No. 10/094,201, filed Mar. 8, 2002, now U.S. Pat. No. 7,136,920, which claims the benefit of U.S. Provisional Application No. 60/274,510, filed Mar. 9, 2001, all three applications hereby incorporated herein by reference.

TECHNICAL FIELD

The present invention relates to wireless communication systems.

BACKGROUND

The concept of an email virus is relatively new. The now infamous 'I LOVE YOU' virus is an example of an email virus that caused serious damages to systems using the Microsoft™ Outlook™ email system. In the month of May 2000, about 10 billion dollars worth of damage was attributed to this one email virus alone.

In order to understand how such damages are incurred, consider the way in which this type of virus operates. When activated by opening an infected file attachment, the virus reads an address book and proceeds to send copies of itself as an attachment to email messages addressed to recipients selected from the address book. The infection continues at each recipients' mailbox whenever they open the infected message attachment. Even when a recipient does not activate the virus by opening the attachment, the recipients' mailbox is flooded with copies of the infected email message merely because their email address was in the address book of a correspondent who activated the virus.

Furthermore, because of the coupling of wireless communication systems to email, such viruses may also flood wireless messaging services. Damage to wireless systems occurs when the unsolicited flood of messages exceeds the limited bandwidth capacity of the wireless systems.

Although anti-virus software offers some protection for wireless messaging services from such an attack, there are still needs which cannot be met by such software. The initial attack of a new strain of virus is undetectable to installed virus protection software. The effects of 'I LOVE YOU' are an example of this, as are the somewhat less publicized effects of variations thereof, which would defeat virus protection software by randomly changing the subject line of the infected email message sent to carry the virus. To make matters worse, some virus protection software strips infected attachments but then sends the original message without the attachment, as well as a further message indicating that the attachment was deleted, to each recipient of an infected email message, resulting in twice as many email messages flooding the recipients' mailbox. Therefore in some cases, when anti-virus software is active, virus protection software can sometimes increase congestion in a wireless messaging system.

SUMMARY

A wireless communication system congestion reduction system is provided. The system may include a messaging server configured to receive and store messages in a memory, a wireless server configured to detect messages, in the memory, that should be sent to a wireless mobile communication device via a wireless communication system, a filter rules database for storing filter conditions and corresponding filter actions, a rules applicator for applying the filter conditions to the detected messages to determine whether the detected messages match filter conditions, and an action applicator for executing the filter actions upon detected messages that match the corresponding filter conditions.

A method for reducing congestion in a communication network is also provided. A communication network in which the method is implemented may include a wireless communication network, a messaging server, and a wireless server coupling the messaging server to the wireless communication network. The method may comprise the steps of configuring a global filter rule at the wireless server, the filter rule having a filter condition and a filter action, retrieving a message from a message queue associated with the messaging server, applying the filter condition to the message, applying the filter action to the message when the message matches the filter condition, and transmitting the message from the wireless server to the wireless communication network when the message does not match the filter condition.

A wireless communications system is further provided, the system comprising an intranet having desktop messaging clients and an internet gateway in communication with a messaging server, a wireless server in communication with the messaging server, and a wireless gateway in communication with the wireless server, and a wireless network configured to transmit messages between the wireless gateway and wireless mobile communication devices. The wireless server is preferably configured to detect messages received by the messaging server for the desktop messaging clients and to send detected messages to wireless communication devices associated with the desktop messaging clients. The wireless server may further comprise a direct messaging system including a message generator for generating an all points bulletin message body and a list of recipients, an address database for storing wireless network identification numbers for the mobile wireless communication devices, and a message wrapper for generating direct wireless messages addressed to client wireless network identification numbers stored in the address database corresponding to the list of recipients, the direct wireless messages containing the all points bulletin message body.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

A system and method for reducing congestion in wireless messaging systems is disclosed. The wireless congestion reduction system may include a message detector and an all points bulletin (APB) generator. The message detector applies predefined filtering rules to identify and act upon unsolicited email messages to reduce the total number of transmissions in the wireless messaging system. The filtering rules include global and user rules, with the global rules normally having precedence over user rules. The APB generator of the system allows the messaging system to send messages to its wireless clients through direct wireless messages instead of through email messages if the email service of the wireless messaging system is incapacitated.

A congestion reduction system prevents unsolicited messages, such as virus infected email messages, from reaching wireless messaging users on their mobile devices, and may notify all wireless messaging users on their mobile devices without using email in the event that email services are rendered inoperative.

The flow of unsolicited messages between the Internet and a wireless network is discussed with reference to FIGS. 1-3.

Figure 1:
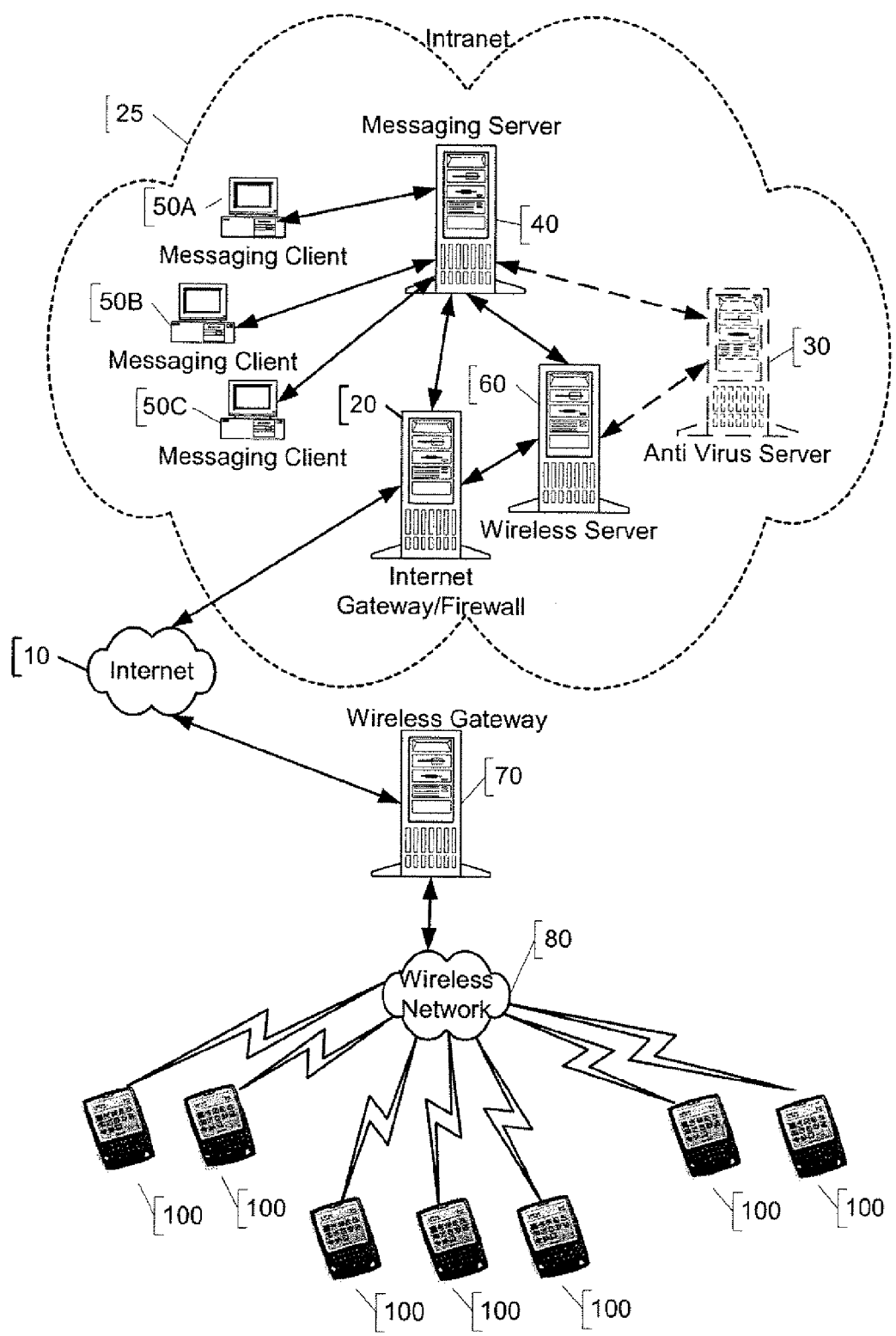
FIG. 1 is a block diagram illustrating an intranet coupled to the Internet and to a wireless network.

FIG. 1 illustrates the general configuration of an intranet coupled to the Internet and to a wireless network. In FIG. 1, the Internet 10 is coupled to an intranet 25 by means of an internet gateway 20. The intranet 25 comprises an internet gateway or firewall 20, an anti-virus server 30 such as Norton™ Anti-virus Server, a messaging server 40 such as Microsoft™ Exchange™, desktop messaging clients 50a, 50b and 50c such as Microsoft™ Outlook™ and a wireless server 60. All of the apparatus in the intranet can communicate with one another by known networking means, such as TCP/IP over Ethernet, or Virtual Private Networking via the Internet. The wireless gateway 70 couples the intranet to a wireless network 80 through the internet 10, allowing communication with a plurality of wireless mobile communication devices ("mobile devices") 100. Although shown as outside the intranet 25, the wireless gateway 70 may instead be implemented within the intranet 25, as a Virtual Private Network (VPN) router for example.

Figure 2:
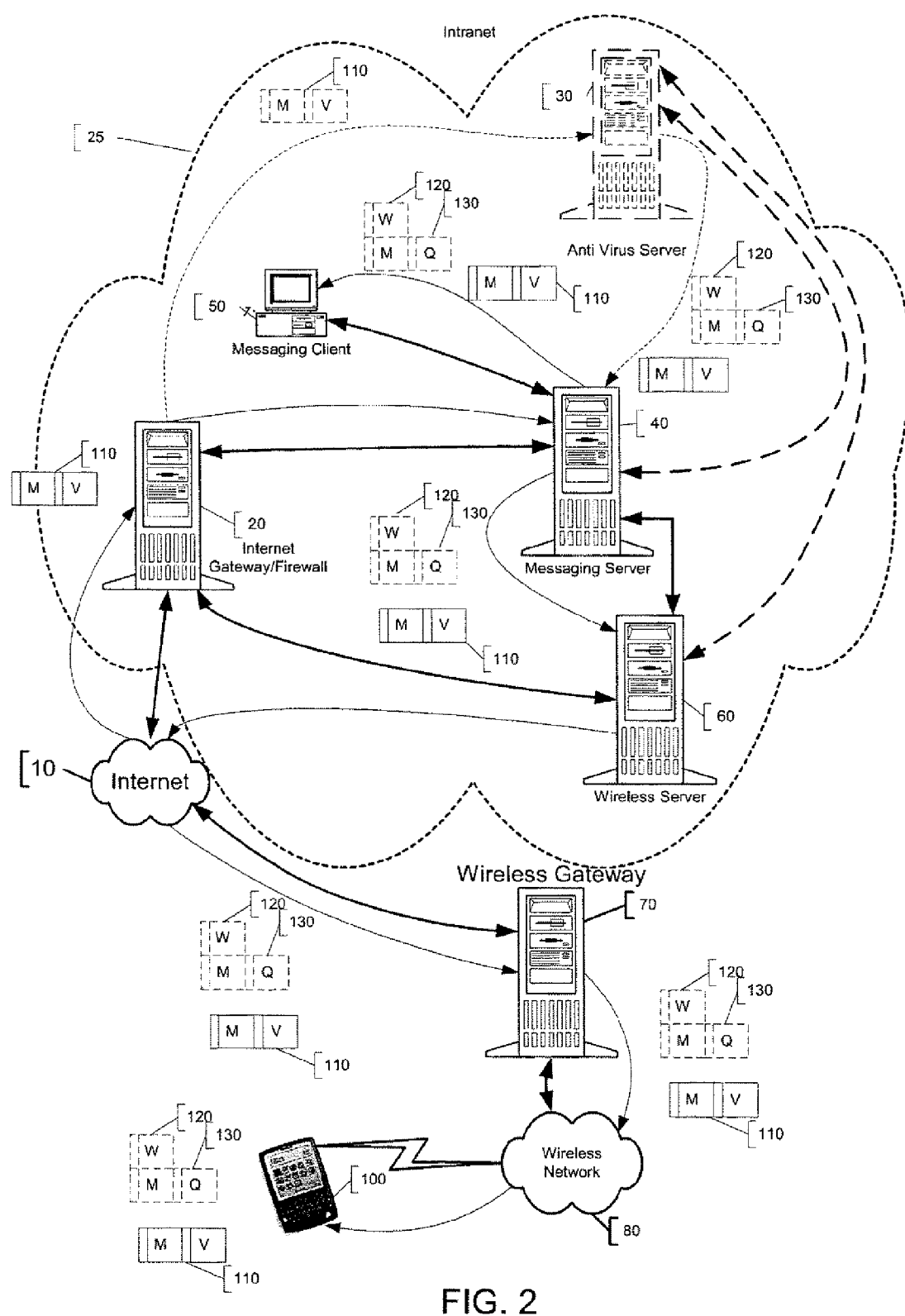
FIG. 2 is a block diagram illustrating the flow of unsolicited messages to the wireless network of FIG. 1.

FIG. 2 illustrates the operating procedure of the intranet 25 and wireless network 80 of FIG. 1 in a scenario where a virus attachment in an email message from the internet 10 is detected by the anti-virus server 30, which in most implementations would be anti-virus software operating on or in conjunction with either the messaging server 40 or possibly the wireless server 60. In FIG. 2, an unsolicited message 110, such as a message M having an email virus attachment V, arrives from the Internet 10 to the intranet 25 via Internet gateway 20. The message 110 can be scanned by anti-virus server 30, and in the event that the anti-virus server 30 recognizes the virus attachment, the attachment is typically put in quarantine. Once quarantined, message 110 is substituted with message 130 by anti-virus server 30, and anti-virus server 30 also issues an additional warning message 120 indicating that the message has been put in quarantine. If the virus is not recognized, or if the anti-virus server 30 is not used, the message 110 arrives at messaging server 40. Messages 110, 120 and 130 are all addressed to the intranet user having a desktop messaging client 50. The messaging server 40 places the messages in a mailbox, which is read by both the desktop messaging client 50 and wireless server 60. The wireless server then pushes messages 110, 120 and 130 to mobile device 100 via the internet 10, wireless gateway 70 and wireless network 80. The generation of additional messages 120 and 130 can consume wireless communication bandwidth, especially if multiple users of the wireless network 80 are affected by the virus. Although not explicitly shown in the drawings, unsolicited message 110 can originate from a desktop messaging client 50 or mobile device 100 in alternate scenarios.

Figure 3:
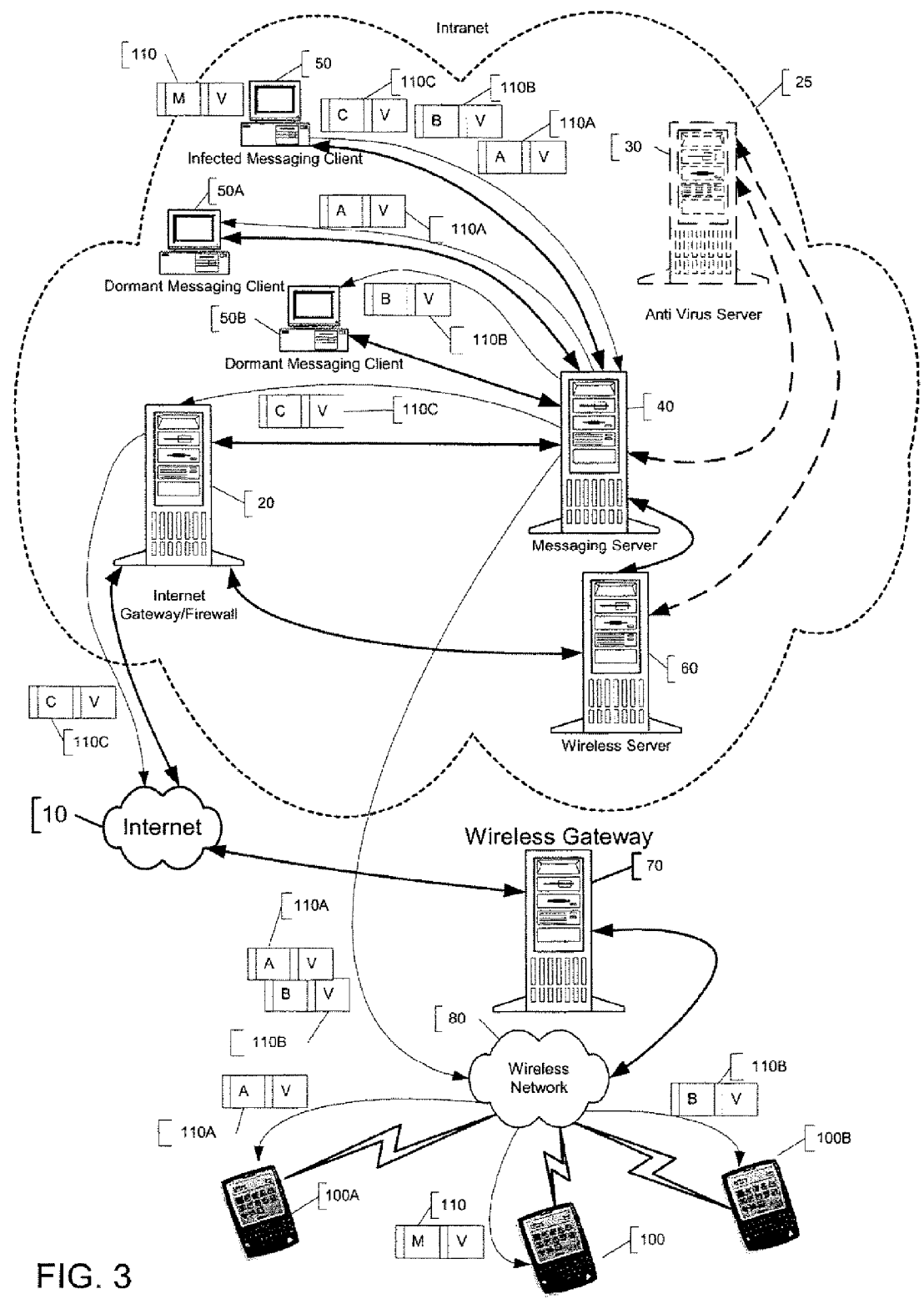
FIG. 3 is a block diagram illustrating a source of unsolicited messages from the intranet of FIG. 1.

FIG. 3 illustrates propagation of a virus in an email attachment within the intranet and wireless network of FIG. 1 in a scenario where the virus attachment is not detected by the anti-virus server 30. In FIG. 3, virus attachment in message 110 is activated by a desktop messaging client 50, resulting in a series of email virus attacks targeting recipients A, B and C via messages 110A, 110B and 110C respectively. The message portions of messages 110A, 110B and 110C are denoted by the letters "A", "B" and "C" respectively, and each have a virus attachment denoted by the letter "V". Because all messages are held in the messaging server 40, messages 110M, 110A and 110B may also pushed to mobile devices 100, 100A and 100B by wireless server 60. The infection may be spread to other networks on the Internet 10 via message 110C after it passes through internet gateway 20 and is routed to a recipient C. Although not explicitly shown in the diagrams, the infection can cause multiple messages to be sent, which may be damaging to wireless networks because this reduces the bandwidth available to wireless messaging devices. Further consumption of bandwidth occurs if the virus attachment is quarantined and a warning is issued. This can be particularly severe when a desktop messaging client 50 is infected, as illustrated in FIG. 3.

Figure 4:
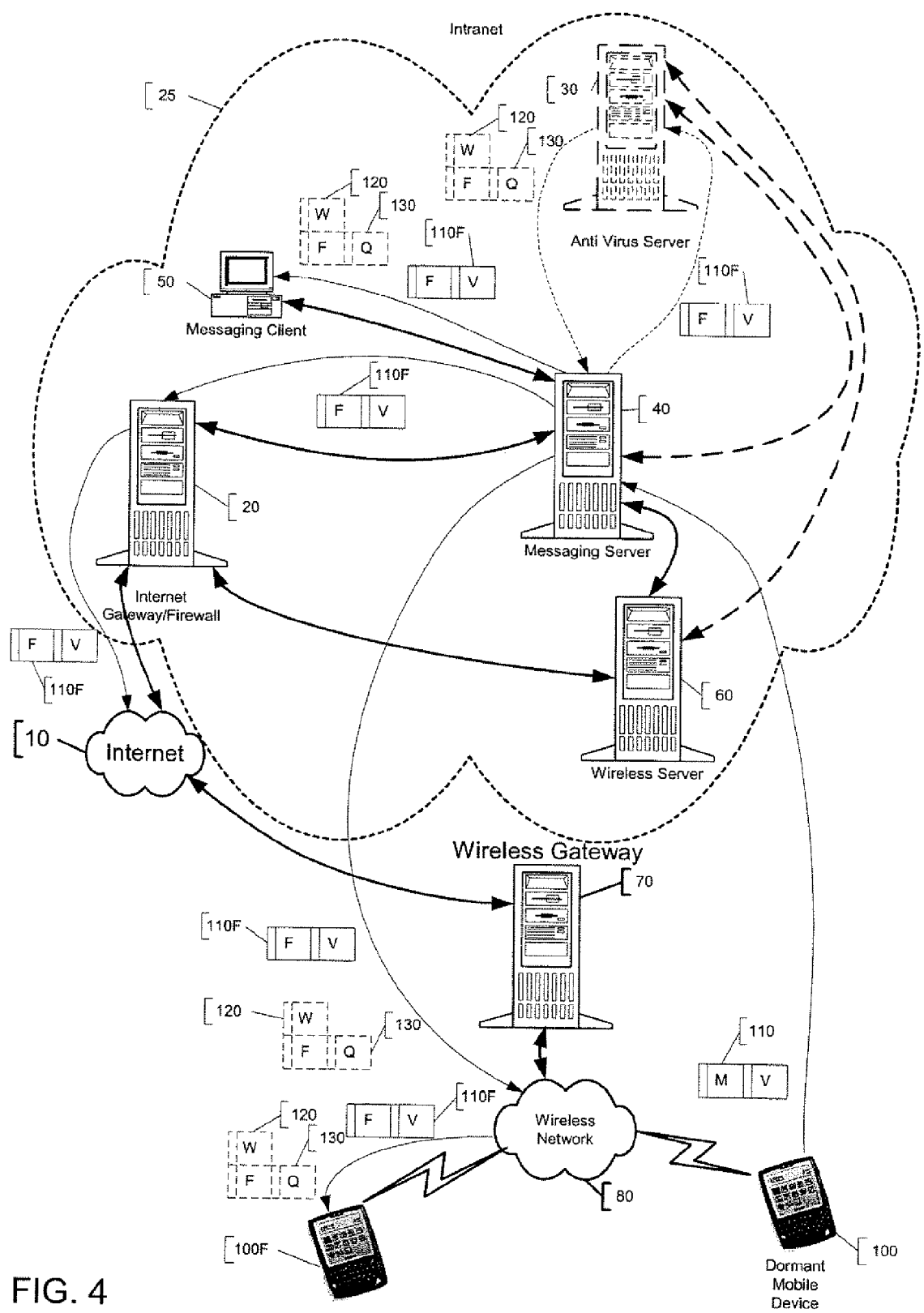
FIG. 4 is a block diagram illustrating a source of unsolicited messages from the wireless network of FIG. 1.

FIG. 4 illustrates propagation of a virus whereby the source of the virus messages is a mobile device 100F. An unsolicited message 110F with a virus attachment is forwarded by mobile device 100F. If message 110F is directed to an address on the Internet 10, message 110F proceeds out to the Internet 10 via Internet gateway 20, possibly causing further infections on other intranets as described in FIG. 3. Assuming message 110F is directed to an address on the intranet 25, message 110F, or messages 120 and 130 in the event that the message is recognized by anti-virus server 30, proceed to the mailbox of desktop messaging client 50 and corresponding mobile device 100 through the wireless network 80. Hence the virus continues its propagation in a manner previously shown in FIG. 3 and congestion of the wireless network increases as the virus propagates through the intranet 25.

Figure 5:
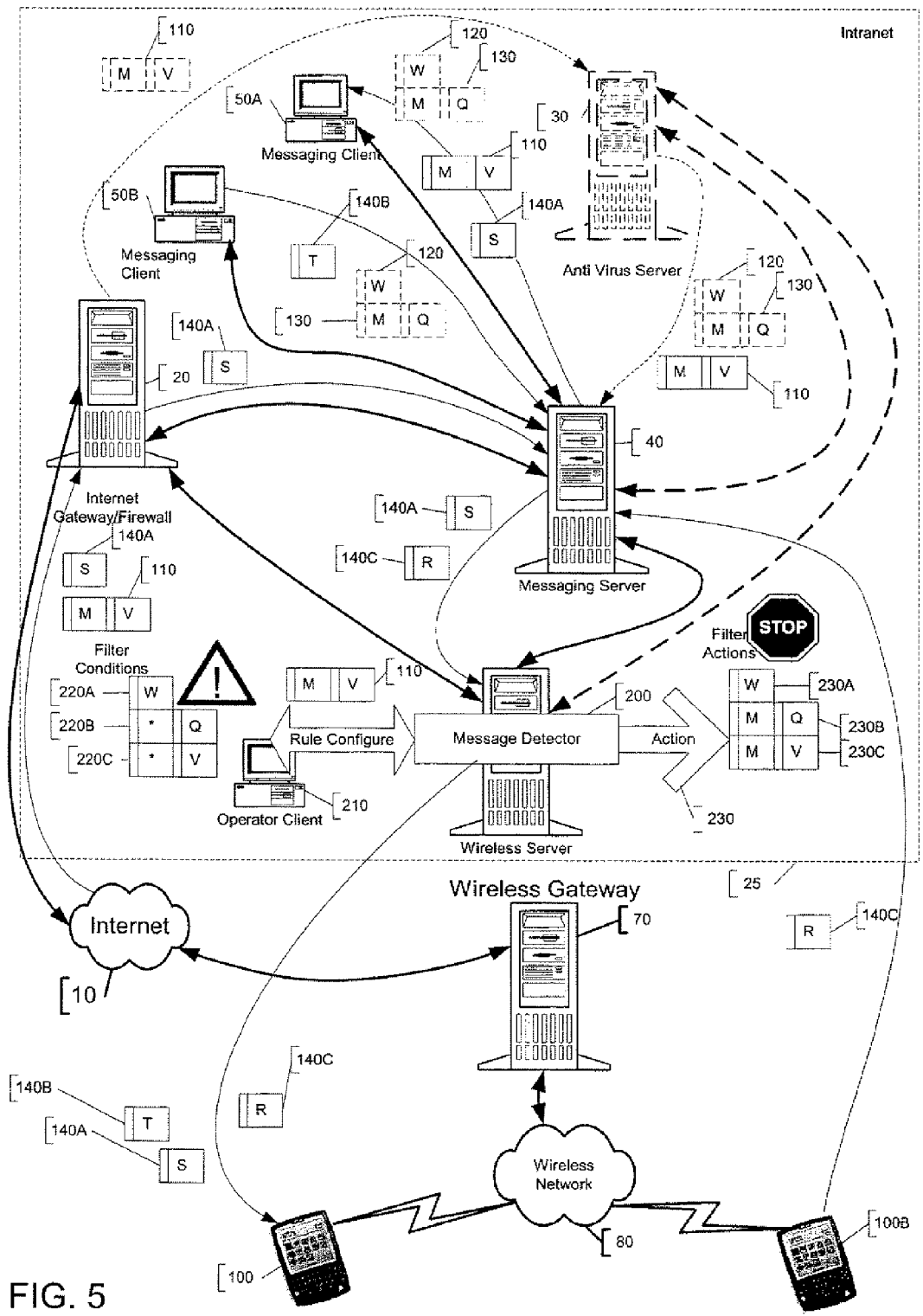
FIG. 5 is a block diagram illustrating the use of a message detector.

FIG. 5 is a block diagram illustrating the use of a message detector. A message detector applying global filter rules is used to detect and act upon messages having characteristics matching those of the global filter rules. For example, once a message matching any one of the global rules is detected, the message may be barred from the wireless network 80. In FIG. 5, a message detector 200 is hosted on the wireless server 60, and configurable by a wireless server administrator via the operator client 210. Through the operator client 210, the wireless server administrator is able to configure a plurality of global filter rules comprising filter conditions such as 220A, 220B and 220C, and corresponding filter actions such as 230A, 230B and 230C.

In general operation, the flow of unsolicited messages 110, 120 and 130 up to the wireless server 60 proceeds as described in FIG. 2. However, when the unsolicited messages arrive at wireless server 60, the message detector 200 scans the messages and applies the global filter rules 220A, 220B and 220C. In the case of a match between a global filter rule and a message, a corresponding action for the matched global rule is executed. In the present example, the global filter actions are configured to match unsolicited messages such as 110, 120, and 130. Desired messages 140A, 140B and 140C would not match filter conditions 220A, 220B and 220C. Because unsolicited messages 110, 120 and 130 match filter conditions 220A, 220B and 220C, they are blocked from entering and congesting the wireless network 80. Other alternate pre-configured filter actions include pushing the message and pushing a subset of the message, for example. Those of skill in the art would understand that there are various types of filter actions that can be implemented in addition to the previously discussed filter actions.

The flow for desired messages 140A, 140B, and 140C destined for messaging client 50A and corresponding mobile device 100 is now discussed. Message 140A having a message portion denoted by the letter "S" arrives from the Internet 10 via Internet gateway 20. Message 140B having a message portion denoted by the letter "T" is sent by desktop messaging client 50B, and message 140C having a message portion denoted by the letter "R" is sent by mobile device 100B. Since these desired messages do not match any of the global filter rule conditions 220A, 220B and 220C for unsolicited messages, these messages arrive at mobile device 100 instead of being blocked by the global filters 200 at the wireless server 60. Congestion of the wireless network 80 is thereby reduced when unsolicited messages are detected and acted upon within the wireless server 60 by the global filter rules.

Figure 6:
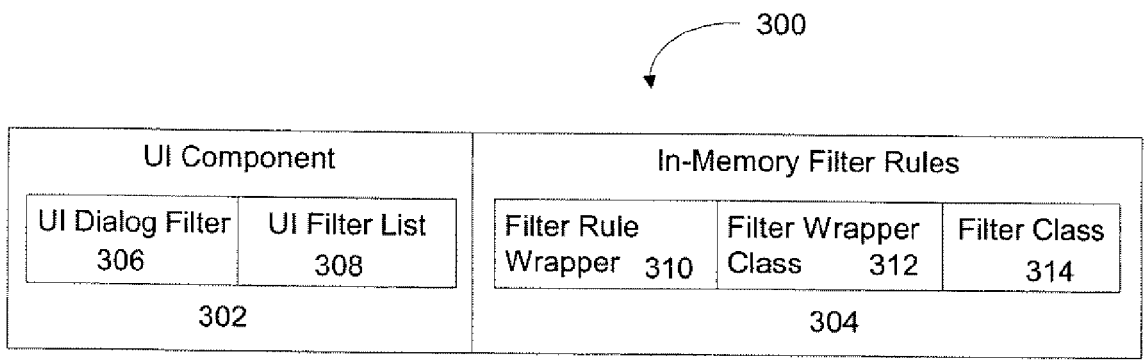
FIG. 6 is an illustration of an exemplary structure of global filter rules used in the message detector of FIG. 5.

FIG. 6 is an illustration of an exemplary structure of global filter rules used in the message detector of FIG. 5. Global filter rule 300 comprises two components or categories. The first is a user interface component 302 and the second is an in-memory filter rule 304. User interface component 302 includes a UIDialogFilter 306 for allowing an administrator to edit a particular filter rule or to create a new filter rule, and a UIFilterList 308 for displaying existing rules and allowing the administrator to edit or delete an existing rule. UIFilterList 308 also permits the administrator to invoke the UIDialogFilter 306 to add a new rule. The in-memory filter rule 304 is made up of software objects, which are instances of corresponding classes. The FilterRuleWrapper class 310 encapsulates message filter conditions and actions, where a condition is an expression defined in terms of message fields, such as the "send to" and "from" addresses of a message, or the message sensitivity. Actions indicating what should be done with a message that matches the conditions, such as forwarding the message to a mobile device or forwarding message header only, are another responsibility of FilterRuleWrapper class 310. FilterWrapper class 312 maintains a list of FilterRule objects corresponding to the UIFilterList 308, and responds to user requests to insert a rule, delete a rule, or modify a data member of a rule. Filter class 314 is an interface to a message store database which provides for loading, saving, parsing, and packing the in-memory filter class objects to and from a database.

Figure 7:
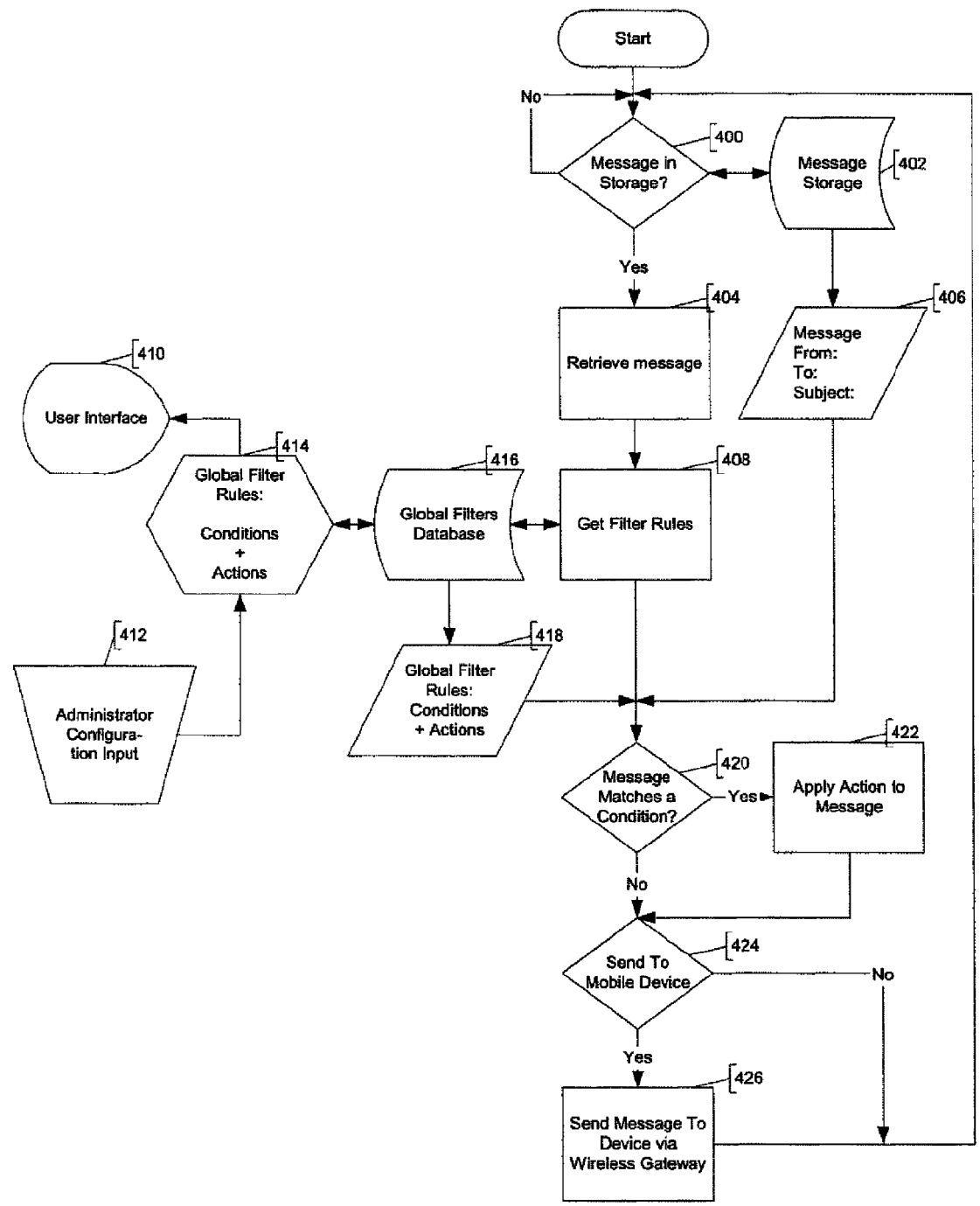
FIG. 7 is a flowchart illustrating a method of detecting unsolicited messages by the message detector of FIG. 5.

FIG. 7 is a flowchart illustrating a method of detecting unsolicited messages by the message detector of FIG. 5. A global filters database 416 stores global filters manually configured with conditions and actions as indicated at 414 through configuration inputs 412 made by an administrator via user interface 410. Message storage 402 provides messages 406 to be processed by the global filters. Messages arriving at the messaging server 40 that are to be sent to a mobile device 100 are processed using the global filter rules 416. Therefore, the message storage 402 may be implemented at the messaging server 40 or wireless server 60 in the preceding block diagrams. For example, when a message is to be sent to a mobile device, it may be marked in a user's mailbox in a message store at the messaging server 40 or copied into a separate message store.

At step 400, the message storage 402 is accessed in order to determine if a message is in the storage to be processed. If there is no message, the message storage 402 is checked at step 400 until a message for processing is detected. In the event that there are one or more messages to be processed, preferably the oldest message in the message storage 402 is retrieved from message storage 402 at step 404. At step 408 the global filter rules 418 are obtained from global filters database 416. At step 420, a determination is made as to whether the message matches any of the conditions in the global filters corresponding to a filter rule with an associated pre-configured action. In the event that the message matches at least one condition, the corresponding pre-configured action for that particular condition is applied to the message at step 422, which can include marking the message so that it is not sent to a mobile device 100, such as a handheld data communications device. At step 424, a determination is made as to whether the message should be sent to the mobile device. Step 424 may include such operations as determining if the message was marked so that it is not sent to a mobile device 100 and applying secondary filter rules such as user filters to a message that does not match any of the global filter conditions. User filters are discussed in further detail below. In the event that it should be sent, the message is sent at step 426. The method restarts at step 400 in order to process the next message available in the message storage 402 after the message is sent in step 426 or after it is determined in step 424 not to send the message.

As described above, global filters can be used in conjunction with user filters. A user filter is similar to a global filter, except that it is applied only to those messages that are addressed to one user. Global filters preferably have precedence over user filter rules. In other words, global filters are applied before user filters are applied.

When a wireless server 60 starts up, a global system manager object preferably creates an instance of an initial Filter object, based on the Filter class described in FIG. 6 for example. The Filter object may then proceed to load in-memory filter class objects from a database. This initial Filter object assumes the role of the global filter for the wireless server 60. The global system manager object within the wireless server 60 provides every user control object, each instance of which corresponds to a mobile device user, with access to the global filter object. The rules described in the global filter object are applied to messages that are destined to the mobile device user by their associated user control object. User defined rules are also applied in the user control objects. In the event that both a global filter rule and a user filter rule match a given message, precedence is given to the actions of the global filter rule. A filter rule is said to match a given message when the conditions associated to the rule are true for the given message.

A user control object may have both a global filter rule and a user rule. For example, the user rule may specify a condition that a message having the email address user@company.com in its "send to" has an associated action of forwarding the message to the recipient's mobile device, whereas the global rule specifies a condition that a message having the expression "*" corresponding to all possible email addresses in its "send to" field is not forwarded to any mobile device. Even though both conditions may match a pending message destined to user@company.com, the global filter rule takes precedence over the user rule and only the actions associated with the global rule would be taken. In this example, the matching message would not be forwarded to any mobile device.

Another example of a global rule is one which searches for the string 'I LOVE YOU' in the subject line, with an associated action to not forward the message. The search operation is accomplished by using regular expressions to match characters in the associated message fields. Yet another example would be a global rule that searches for the string 'NAV' in the 'from' field of the message. The 'NAV' indicates that the message is sent from a Norton Anti-Virus™ software. The associated action for either of these conditions would preferably be not to forward the message or alternatively to mark the message so that it is not forwarded to any mobile device, as described above.

Having described global filter rules based on a single matching condition, it is also within the scope of this invention to combine a plurality of matching conditions into one using several Boolean operators such as AND, NOT, and OR. Furthermore, each condition can express a regular expression matching a combination of fields.

The use of global filter rules and user rules thereby classifies messages into desired wireless messages, which are sent to mobile devices, and undesired messages such as unsolicited messages which remain in mailboxes or are deleted, and are not sent to mobile devices.

Global filter rules put wireless server administrators, corporate IT departments for example, in control of the types of messages sent to mobile devices. Administrators can thereby define filters that reduce the overall traffic sent to mobile devices from a wireless server, ensuring that only solicited and other types of desired messages are sent to mobile devices. Therefore, in the event of an email virus attack, unsolicited messages coming from the virus itself and unsolicited messages coming from virus protection software are contained within a local networked system, such as an intranet, to help ease congestion on the wireless network and improve overall end-user experience.

Figure 8:
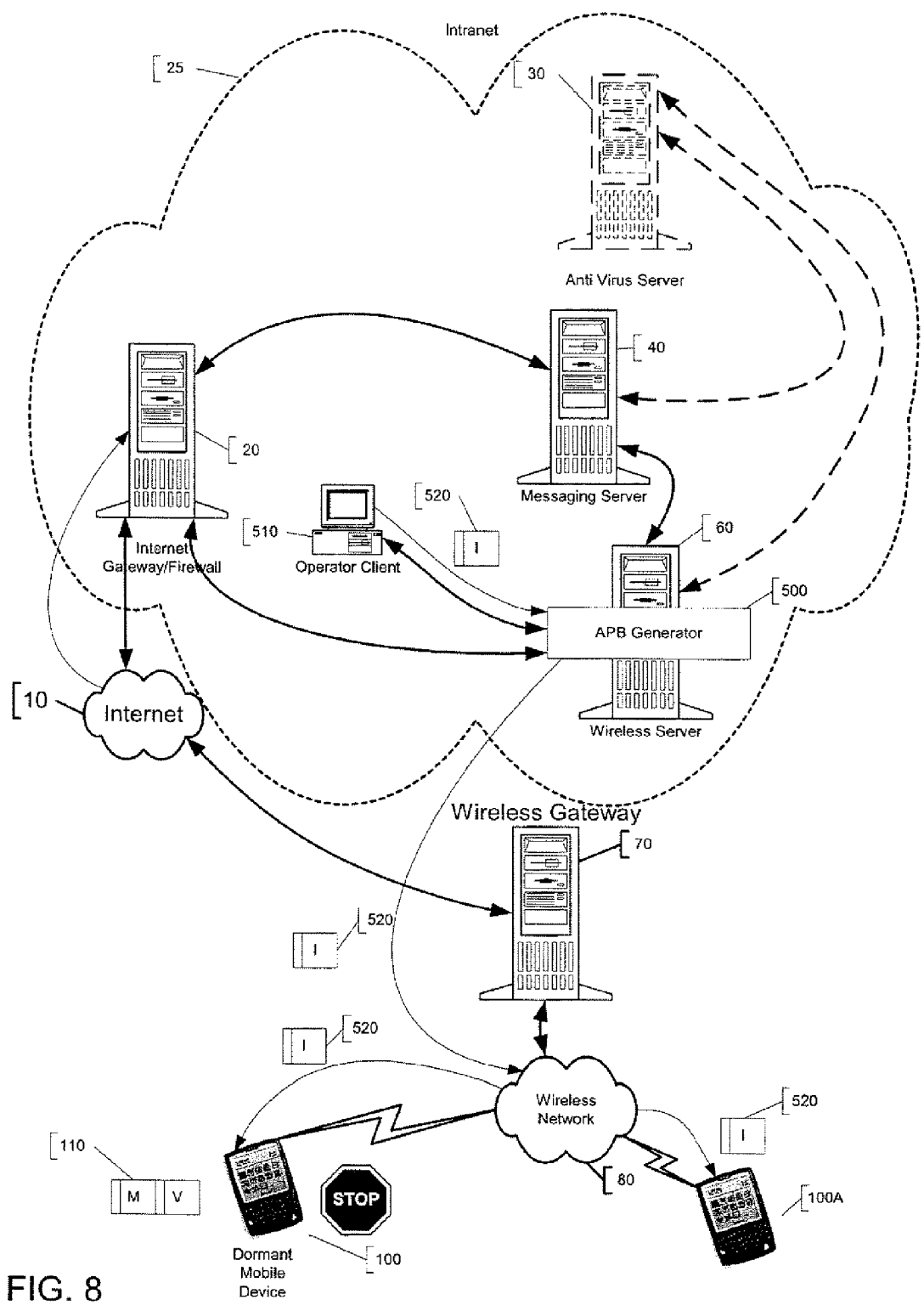
FIG. 8 is a block diagram illustrating the use of a direct wireless messaging all points bulletin generator to prevent the spread of unsolicited messages.

FIG. 8 is a block diagram illustrating the use of a direct wireless messaging all points bulletin generator to prevent the spread of unsolicited messages. A direct wireless all points bulletin (APB) permits communication of the messaging server status to mobile devices in the event that email service has been incapacitated due to a virus for example. An APB via direct wireless messaging is a message that is destined for all users of a particular wireless server. As such, it is different from an email distribution list or an email all points bulletin since it utilizes direct wireless messaging to bypass the email sub-systems altogether. Instead, an all points bulletin via direct wireless messaging makes use of wireless messaging infrastructure in order to communicate a message to all of the mobile devices configured for operation in conjunction with a wireless server. In FIG. 8, direct wireless APB generator 500 is hosted on wireless server 60. Generator 500 comprises an interface to operator client 510 to receive message 520 addressed to a plurality of wireless network users. Wireless server 60 sends the APB message 520 to all the addressed wireless messaging devices 100 and 100A via wireless network 80. In direct wireless messaging, a wireless network identification number, such as a personal identification number (PIN) of each wireless messaging device, is used instead of a common email address that is effectively shared between a mobile device and a desktop messaging client as described above. The user of mobile device 100 may choose not send dormant virus 110 as a result of wireless APB message 520 providing information about the messaging server 40 being down due to the virus.

Figure 9:
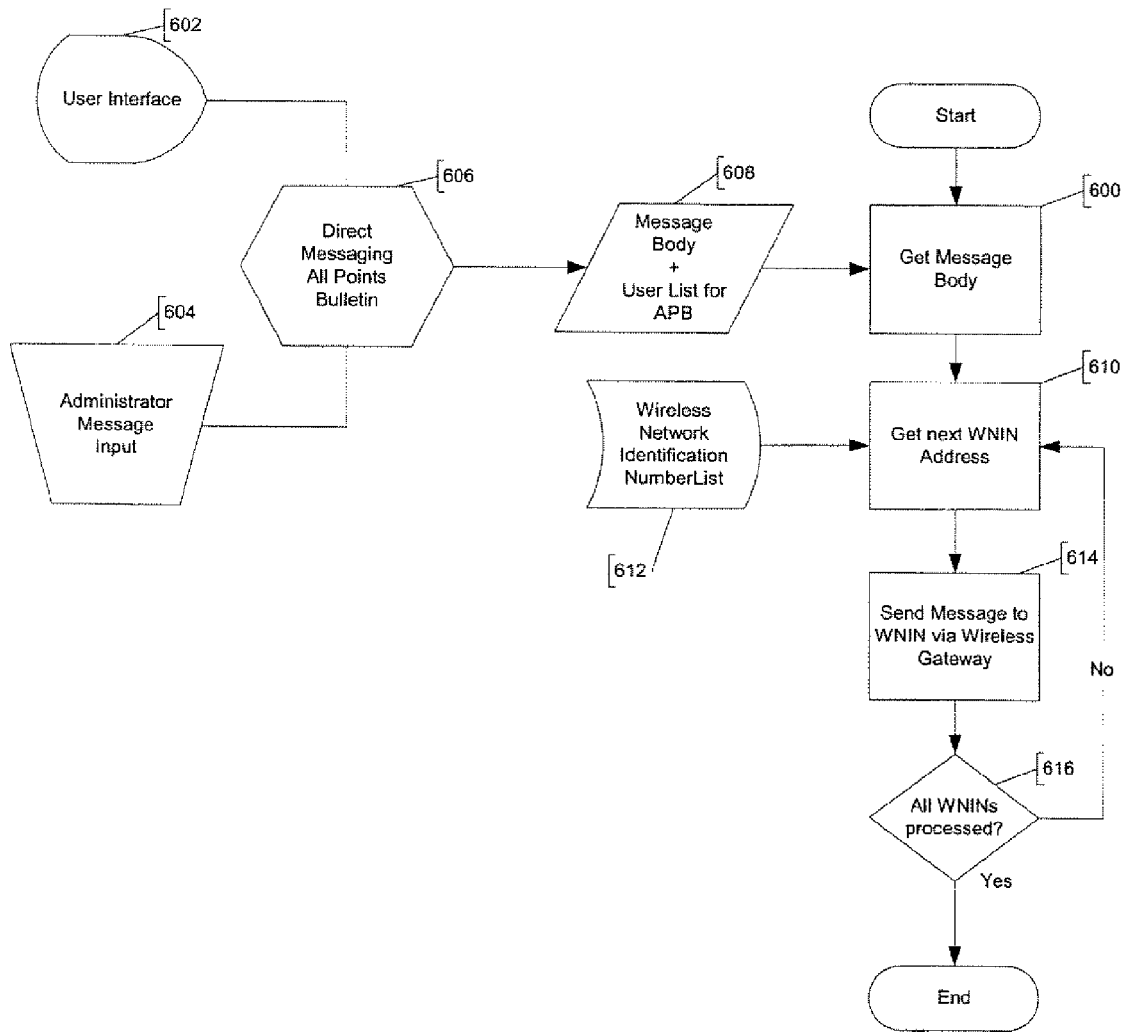
FIG. 9 is a flowchart illustrating a method of generating a direct wireless all points bulletin message by the direct wireless messaging all points bulletin generator of FIG. 8.

FIG. 9 is a flowchart illustrating a method of generating a direct wireless all points bulletin message by the direct wireless messaging all points bulletin generator of FIG. 8. Manual operation 606 of user interface 602 to provide configuration inputs 604 provides an APB message 608. At step 600, the message body and user list is obtained from APB message 608. At step 610, a wireless network identification number (WNIN) is obtained from wireless network identification number list storage, such as a database, 612, by looking up a user in the APB user list. At step 614, the APB message is sent to the particular WNIN obtained in step 610. At step 616, a determination is made as to whether all WNIN's in the user list have been processed. If there are still WNIN's in the user list that have not been processed, the method repeats at step 610 until the APB has been sent to all users in the user list. Alternatively, the APB message and a list of WNIN's for each user to which the APB message is to be sent could be sent to the wireless gateway 70 as a single message, and the wireless gateway 70 could then send the APB message body to each WNIN in the list.

Although this particular embodiment illustrates manual operation generation of APB message 608, automated APB messages can be generated, for example for advertising purposes. In further alternate embodiments, a periodic APB can instruct all users on enabling further services in deployments where a mobile device is only enabled for direct wireless messaging. Additionally, direct wireless APB generator 500 can provide a means to send an announcement with instructions on obtaining an email address to new users of a wireless messaging device.

A wireless server administrator may thereby send an APB to each mobile device registered on a wireless server 60 without the messages going through a messaging server 40, such as an Exchange Server. Unlike known system which use email distribution lists, where the APB is sent to each user's email address, systems according to aspects of the present invention send the messages directly to a mobile device using the device wireless network identification number (WNIN). In the event that an email virus attack cripples mail servers, APB messages can still be sent to all mobile device users informing them of the status of the email system. Thus, there is less reliance on messaging servers, and mobile device user frustration is minimized during an email outage. Furthermore, for those users who are prone to accidentally activating the virus when they open it on their desktop messaging client, the wireless messaging APB messages may be sent to users' mobile devices to instruct the users to delete the unsolicited messages from their desktop.

The previous discussion of the message detector 200 shown in FIG. 5 and the direct wireless all points bulletin (APB) shown in FIG. 8, provide methods for mitigating wireless network congestion. In a preferred embodiment, the message detector and direct wireless APB are combined to form a wireless network congestion minimizing system for mitigating damage from unsolicited messages.

Figure 10:
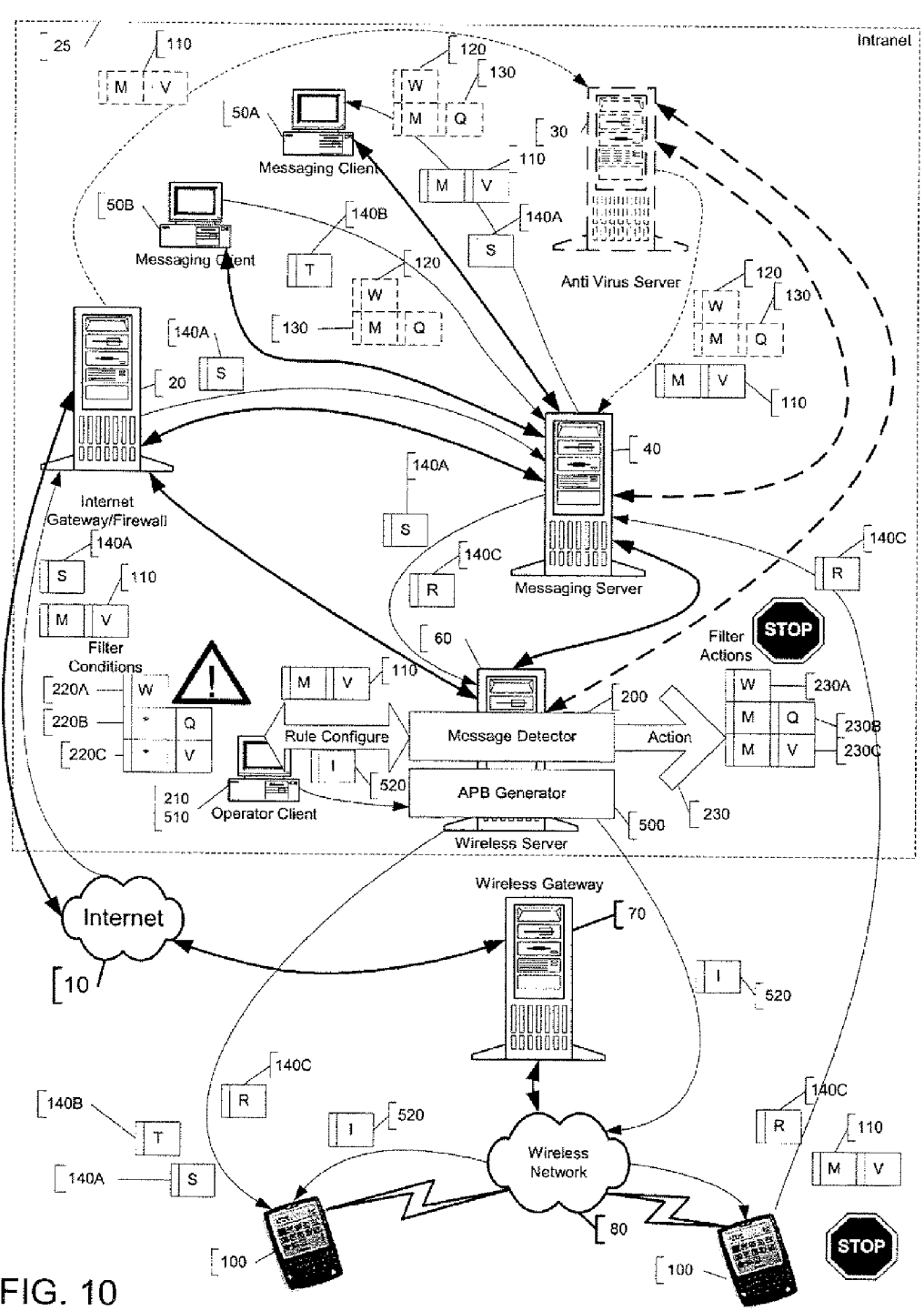
FIG. 10 is a diagram illustrating the use of a wireless congestion reduction system.

FIG. 10 is a diagram illustrating the use of a wireless congestion reduction system. In FIG. 10, the message detector 200 of FIG. 5 is combined with the direct wireless all points bulletin generator 500 of FIG. 8. The operation of each of these two elements is substantially the same as previously described. However, several benefits result from operating both systems concurrently. It can be seen that the combined effect of global filters and APB is to allow desired messages 140A, 140B and 140C to reach mobile devices 100 while at the same time preventing unsolicited messages 110, 120 and 130 from damaging the wireless network 80 by consuming bandwidth. Furthermore, APB message 520 is received by all mobile devices 100 so as to prevent the forwarding of unsolicited messages, and to encourage users to delete them from their mobile device 100 and possibly a desktop messaging client.

The wireless congestion reduction system of FIG. 10 will prevent excessive congestion of the wireless network 80 with unsolicited messages. For example, a wireless server 60 administrator can first create global filters with a condition that matches the flood of unsolicited messages with the associated actions of not transmitting matching messages. An APB message may then be issued to notify messaging users of the status of the messaging server 40 when the global filters are activated. Finally, a second APB message can be issued to notify messaging users of the status of the messaging server 40 at some later time, for example when fewer unsolicited messages are being detected. Although the present example illustrates configuration of the global filters and issuance of the APB messages manually, aspects of the wireless congestion reduction system can be automated. For example, once an unsolicited message is identified by message detector 200, an automatic APB message can be generated by APB generator 500 to notify and warn an intended recipient user, or all users, about the unsolicited message. Furthermore, global filter rules can be automatically created by the wireless congestion reduction system by updating its database with a "black-list" of known unsolicited messages or unsolicited message senders. Further aspects of the wireless congestion reduction system that can similarly be automated to further ease use of the system.

If a "black-list" is unavailable or inappropriate for generating global filters, then a customized list can be generated through the application of an all-matching global filter. The use of a global filter which matches all messages is guaranteed to stop a flood of unsolicited contentious messages to the wireless users. However, such an all-matching filter would also prevent solicited non-contentious messages from being delivered to the wireless users. Since there is a virtually infinite number of possible contentious messages, each flood would require specific conditions which can be ascertained by experimentation. The preliminary use of an all-matching global filter provides the time required for such experimentation in order to refine an all-matching filter into an ideal filter that blocks all contentious messages associated with the flood, and lets through all non-contentious messages. At each refinement iteration, those messages which remain in a users mailbox are may be re-processed by the wireless congestion reduction system, thereby ensuring that as the ideal filter is progressively formed, solicited messages are also progressively sent.

The welfare of an intranet and wireless network can be protected from unsolicited and virus carrying messages through use of wireless congestion reduction system as shown in FIG. 10.

Figure 11:
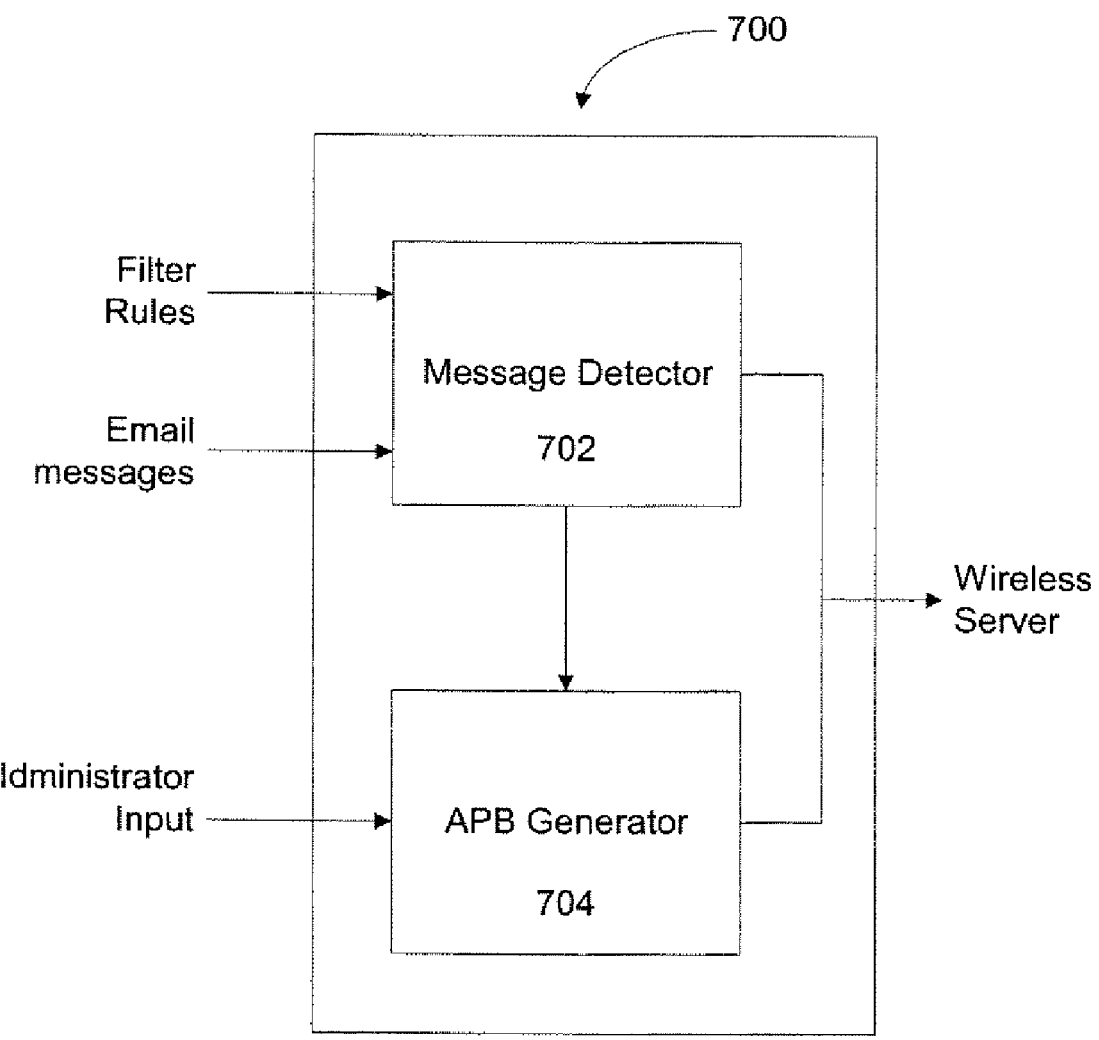
FIG. 11 is a block diagram of the wireless congestion reduction system used in FIG. 10.

FIG. 11 is a block diagram of the wireless congestion reduction system used in FIG. 10. Wireless network congestion minimizing system 700 includes a message detector 702 and an APB generator 704. System 700 receives global filter rules from an administrator, email messages from the messaging server and other administrator input for providing instructions, or actions, to the wireless server. More specifically, message detector 702 receives the filter rules and email messages and matches the email messages to the filter rules. Message detector 702 then instructs the wireless server to execute a defined action upon a matching message, or instructs the wireless server to allow delivery of a non-matching message. In the event that a message matches at least one global filter rule, message detector 702 also instructs APB generator 704 to automatically generate an APB message, which then instructs the wireless server to send the APB message via direct wireless messaging. APB generator 704 also receives administrator input for configuration purposes and for manual generation of APB messages. Message detector 702 operates in the same manner as previously described for message detector 200 of FIG. 5, and APB generator 704 operates in the same manner as previously described for direct wireless APB generator 500 of FIG. 8. Message detector 702 and APB generator 704 are shown in more detail in FIGS. 12 and 13 respectively.

Figure 12:
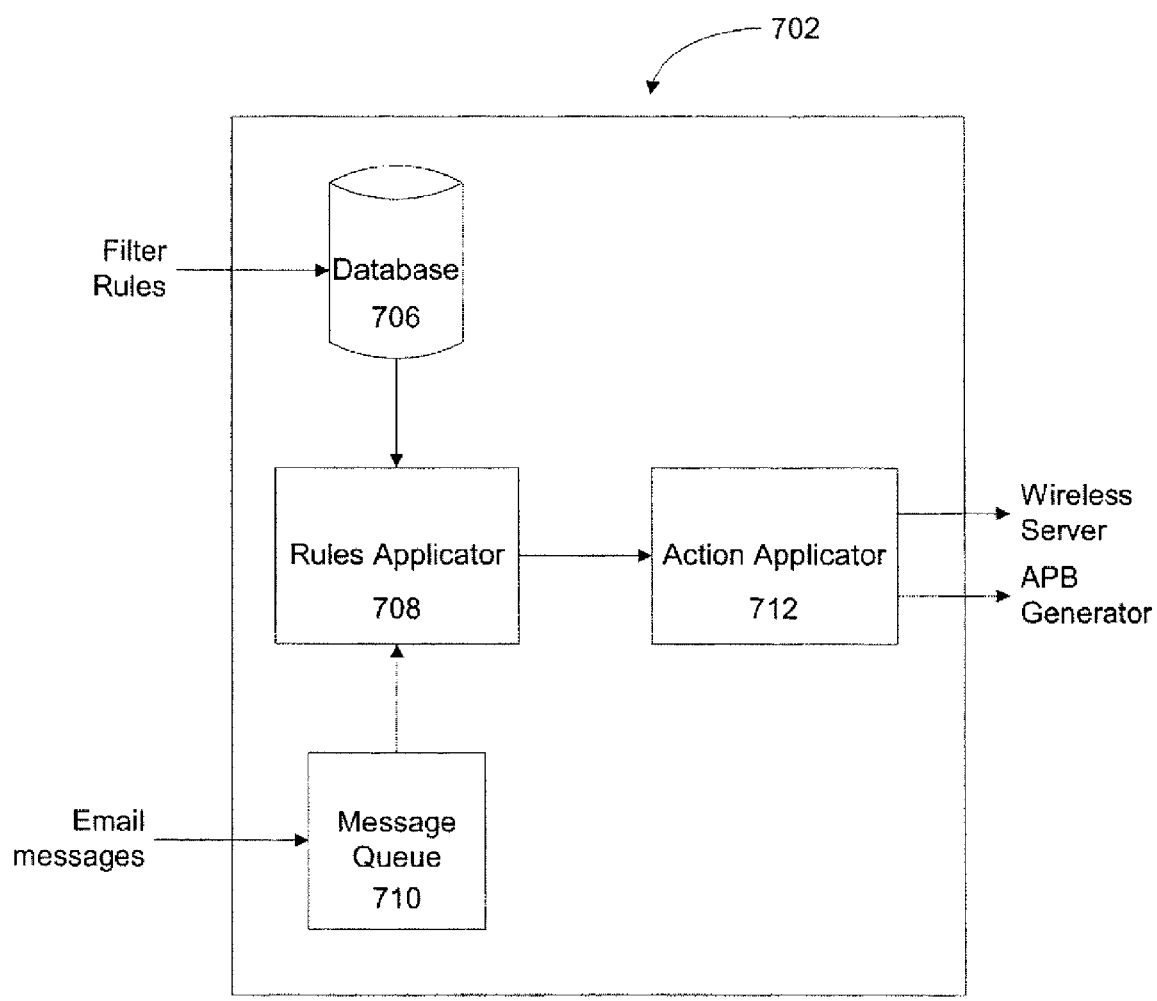
FIG. 12 is a block diagram of the message detector shown in FIG. 11.

FIG. 12 is a block diagram of the message detector shown in FIG. 11. Message detector 702 includes a database 706, rules applicator 708, message queue 710 and action applicator 712. The functions of the components of message detector 702 are described with reference to the flow chart of FIG. 7. Database 706 receives and stores filter rules as described in steps 410 to 416 of FIG. 7.

These filter rules can include the previously mentioned global filter rules and user rules, each of which includes associated filter conditions and corresponding filter actions. Message queue 710 corresponds to message storage 402 of FIG. 7, and stores email messages from the messaging server. Message queue 710 can be of a first-in-first-out (FIFO) type of memory in which messages are removed from the memory in the order that they entered the memory. Rules applicator 708 executes steps 400, 404, 408 and 420 from FIG. 7 for determining if the email messages in queue 710 matches any of the global filter rules in database 706. Action applicator 712 receives the determination from rules applicator 708 and executes steps 422 and 424 from FIG. 7 for applying actions to messages that match global rules. Messages that do not match any global rules do not have any global filter rule-based actions applied to them, and the wireless server is instructed to either apply user filter rules, if any, or send the message to its destination mobile device. For messages that match a global filter rule, the associated action can instruct the APB generator to generate an APB message. Depending on the action, the wireless server may be instructed to not send the message to a mobile device.

Figure 13:
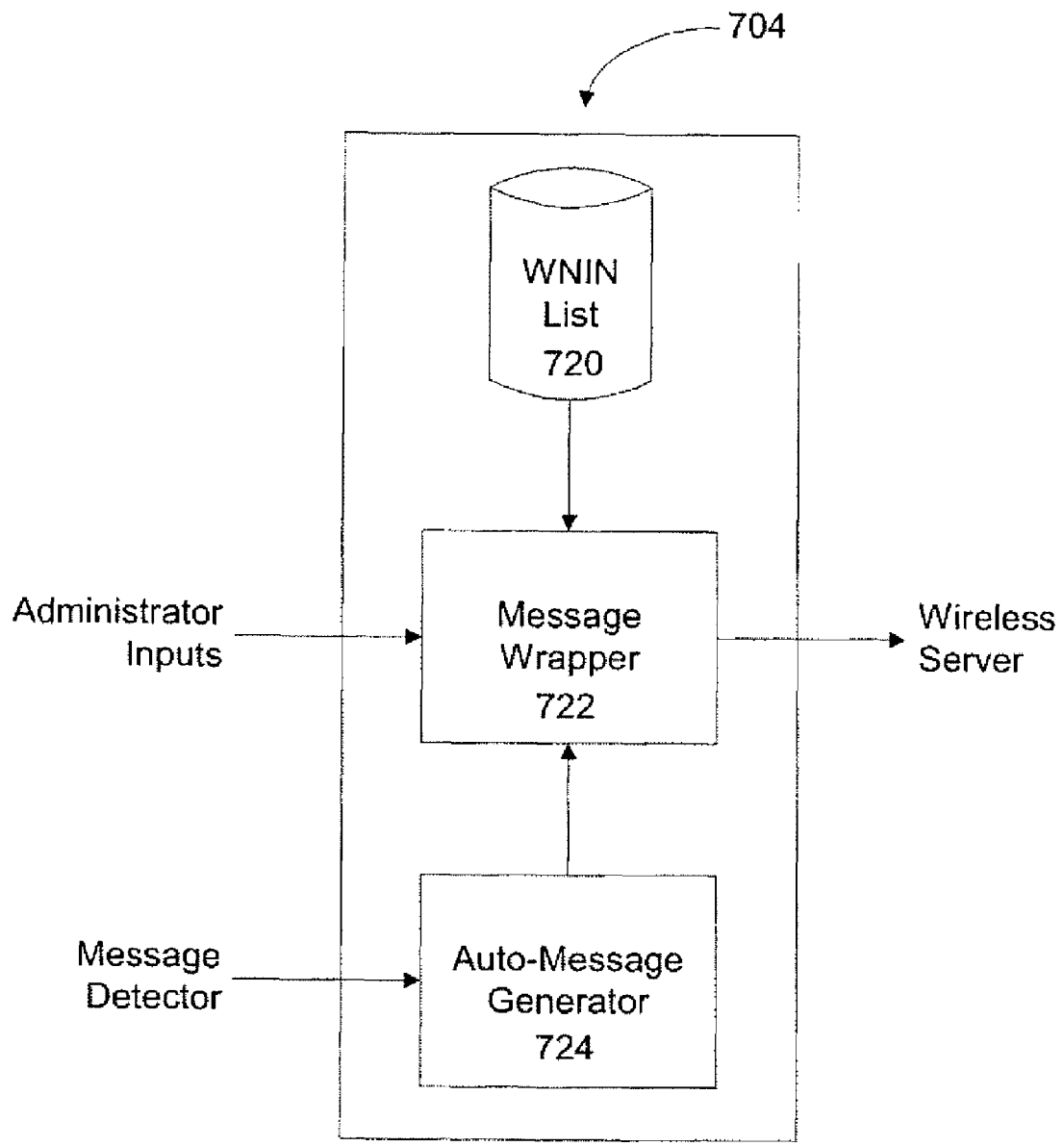
FIG. 13 is a block diagram of the all points bulletin generator shown in FIG. 11.

FIG. 13 is a block diagram of the all points bulletin generator shown in FIG. 11. APB generator 704 includes an address database of wireless network identification numbers 720, a message wrapper 722, and an auto-message generator 724. The functions of the components of APB generator 704 are described with reference to the flow chart of FIG. 9. The database of wireless network identification numbers 720 corresponds to item 612 from FIG. 9, and stores the identification numbers for all the wireless messaging devices. Message wrapper 722 executes steps 600, 610, 614 and 616 from FIG. 9 for generating an APB message and sending the APB message to the wireless messaging devices. The APB message body text can be provided by a wireless server administrator, as shown at 602 to 606 of FIG. 9 and the administrator input to the message wrapper 722 in FIG. 13, or can be provided by auto-message generator 722. Auto-message generator 722 may generate an APB message when message detector 702 has matched a global filter rule to an unsolicited email message, for example. This automatically generated message can have a generic message text indicating that the email message sent from a particular sender or having a particular subject line has been identified as an unsolicited message, or as having a potential virus attached to it. Generally, auto-message generator 724 executes the operations indicated at 602 to 606 of FIG. 9, except that the message body text and list of recipients are automatically generated instead of manually provided by an administrator. More specifically, auto-message generator 724 of the present embodiment automatically generates the message body text and list of recipients in response to the execution of filter actions by action applicator 712.

Although the message detector, APB generator and the wireless congestion reduction system are described above as being hosted on a wireless server, they can also be hosted on other servers of a network which includes a wireless server. However, it is preferable to host the message detector, APB generator and the wireless congestion reduction system on a wireless server because the wireless server is then relatively easily deployed in an existing network with minimum disruption to the existing network.

While wireless congestion reduction systems prevent damage to a wireless network from unsolicited messages containing viruses, the system can also filter other forms of unsolicited messages, based on corporate policy for example. One example of policy-based filtering allows a corporation to prevent employees from receiving messages from head hunters or competitors, or from other banned information sources.

The above-described embodiments of the invention are intended to be examples of the present invention. Alterations, modifications and variations may be effected the particular embodiments by those of skill in the art, without departing from the scope of the invention which is defined solely by the claims appended hereto.

The invention claimed is:

1. A system for forwarding emails, comprising:
    a messaging server device for forwarding emails to mobile communication devices of users to whom the emails were respectively addressed;
    an antivirus server for determining whether an email addressed to a user of a mobile communication device, to be forwarded by the messaging server to the mobile communication device, is infected with a virus; and
    a bulletin generator configured to transmit, in response to determining the email is infected with a virus, to the mobile communication devices besides the mobile communication device of the addressee of the email determined to be infected, an all points bulletin message disclosing the existence of the virus, the bulletin message being transmitted directly to, instead of via email to, the wireless mobile communication devices.

2. The system of claim 1 wherein the bulletin message instructs the users to delete an email message.

3. The system of claim 1 wherein the bulletin message indicates the system has detected and filtered a message.

4. The system of claim 1 wherein the bulletin message indicates a global filter has been activated.

5. The system of claim 1 wherein the messaging server device is configured to refrain from forwarding the email that was determined to be infected.

6. The system of claim 1 wherein the antivirus server determines whether an email addressed to a user of a mobile device is infected based at least partially on text in the subject line.

7. The system of claim 1 wherein the antivirus server determines whether an email is infected based at least partially on the email's sender name.

8. The system of claim 1 wherein the antivirus server determines whether an email is infected based at least partially on whether the email was sent by an antivirus software.

9. The system of claim 1 wherein the bulletin generator is configured to transmit the bulletin message to the mobile communication devices using the communication devices' respective identification numbers instead of their respective email addresses.

10. The system of claim 1 wherein the antivirus server is separate from the messaging server device.

11. The system of claim 10 wherein the antivirus server communicates with the messaging server device through the Internet.

12. The system of claim 1 wherein the messaging server device, the antivirus server and the bulletin generator are hosted on the same server.

13. A system for forwarding emails, comprising:
    a messaging server device for forwarding emails to mobile communication devices of users to whom the emails were respectively addressed;
    a message detector for determining whether an email filtering rule is met; and
    a bulletin generator configured to generate and transmit, in response to the email filtering rule being met, to the mobile communication devices an all points bulletin message, the bulletin message being transmitted directly to, instead of via email to, the wireless mobile communication devices.

14. The system of claim 13 wherein the bulletin message notifies the users of the filtering rule being met.

15. The system of claim 13 wherein the bulletin message instructs the users to delete an email message.

16. The system of claim 13 wherein the bulletin generator transmits the bulletin message to the communication devices' respective wireless network identification numbers.

17. The system of claim 13 wherein the filter rule is applied to emails addressed only to particular users.

18. The system of claim 13 wherein the message detector is separate from the messaging server device.

19. The system of claim 18 wherein the message detector communicates with the messaging server device through the Internet.

20. The system of claim 13 wherein the messaging server device, the message detector and the bulletin generator are hosted on the same server.

* * * * *